June 24, 1941.   I. C. McKECHNIE   2,246,808
VEHICLE LAMP
Filed May 15, 1939
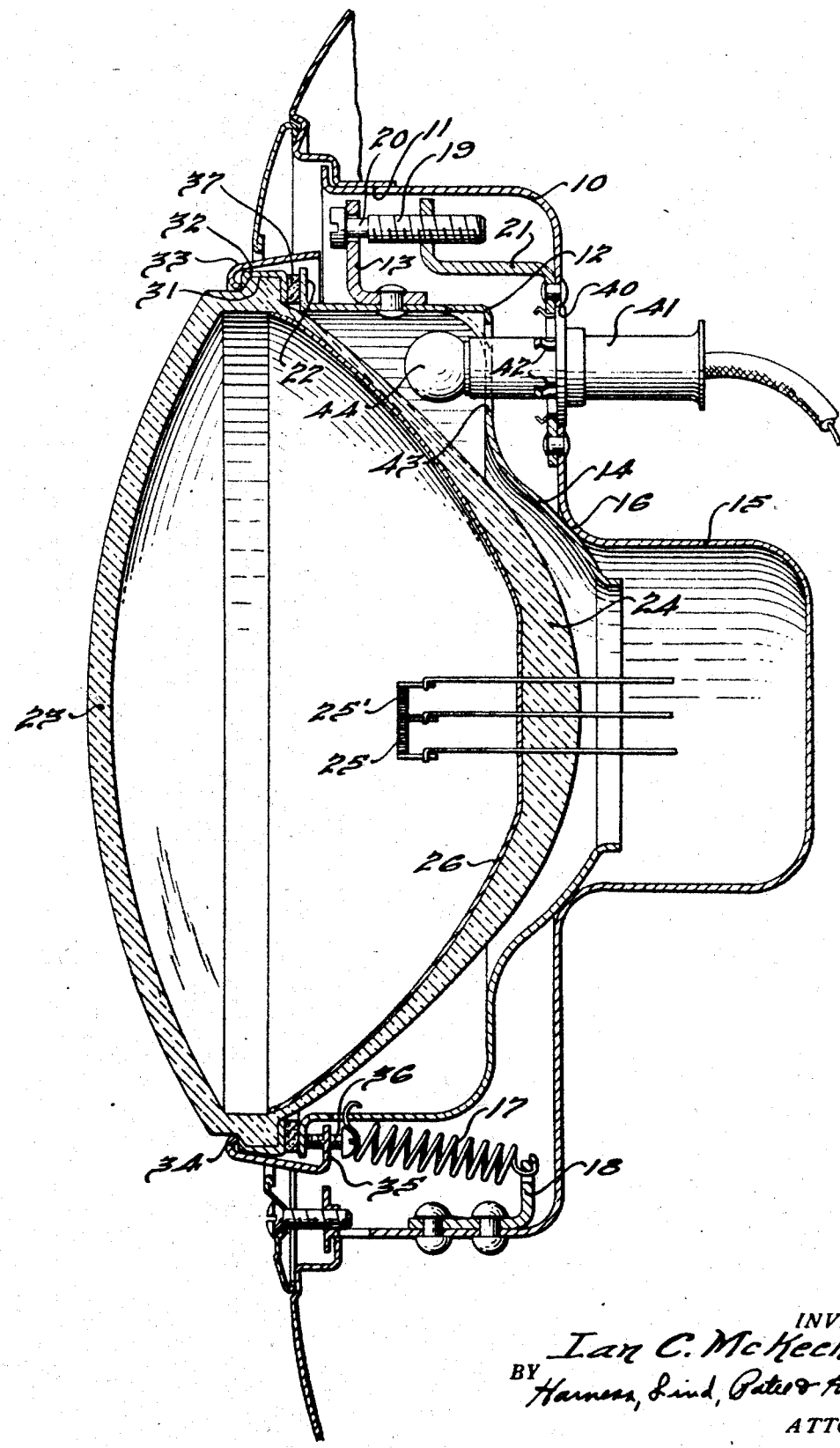
INVENTOR
*Ian C. McKechnie.*
BY *Harness, Dind, Pates & Harris.*
ATTORNEYS.

Patented June 24, 1941

2,246,808

UNITED STATES PATENT OFFICE 2,246,808

VEHICLE LAMP

Ian C. McKechnie, Detroit, Mich., assignor to Chrysler Corporation, Highland Park, Mich., a corporation of Delaware Application May 15, 1939, Serial No. 273,727

2 Claims. (Cl. 240—7.1)

This invention relates to an improved lamp.

More particularly, an embodiment of the invention pertains to improvements in vehicle head lamps of the type which have hermetically sealed lens and light conducting reflector body portions which envelope a film and in which the reflector is provided with an internal reflecting film.

One of the main objects of the invention is the provision of a parking light or other low intensity light element in a lamp of this character which is so arranged as to project light rays upon the reflector body and edgewise through the latter and edgewise through the lens portion of the assembly.

A further object of the invention is the provision of a concealed parking light bulb in a lamp of this kind which emits light rays that illuminate the main lens of a lamp in a clearly conspicuous manner without producing a glaring beam.

A further object of the invention is the provision of an edgewise lighted vehicle head light lens for indicating that the vehicle is parked.

An illustrative embodiment of the invention is shown in the accompanying drawing in which the figure is a central vertical sectional view of a vehicle head lamp embodying the invention.

In the form of the invention illustrated in the drawing, the head lamp includes a sheet metal casing 10 which is received in an opening 11 of the forward portion of a vehicle structure to which the casing 10 is fixed, preferably by welding. Disposed in the casing 10 is a shell 12 having an upstanding bracket 13 at its upper extremity by which it is adjustably supported within the casing. The shell 12 has a belled portion 14 which extends into a dome 15 formed on the rear extremity of the casing 10. The bell portion 14 of the shell 12 is seated for universal swivel type movement in the rounded junction portion 16 between the main body part of the shell 12 and its dome 15. A coil spring 17 attached at one end to the shell and at its other end to a bracket 18 mounted on the casing 10 serves to yieldingly urge the bell portion 14 of the shell 12 against its seat 16. Movement of the bell 14 may be produced by turning an adjustment screw 19 having a neck portion 20 journalled in an aperture of the bracket 13 of the shell and a shank portion threaded in an aperture in a bracket 21 mounted on the casing.

The bell 14 has an open front side surrounded by an outwardly extending radial flange 22 in which is received a unitary assembly comprising a lens portion 23, reflector portion 24 and driving light high and low intensity filaments 25 and 25'.

The reflector and lens portions 23 and 24 respectively, preferably comprise an integrally united assembly formed with glass or other suitable transparent material within which the filaments 25 and 25' are hermetically sealed and the interior of the reflector and lens unit is evacuated. The reflector portion is provided with a thin layer 26 of reflecting material. A circumferential flange 31 integrally formed at the junction of the lens and reflector portions is surrounded by a rim 32 having a channel-shaped cross section and having side walls adjacent the sides of the flange 31.

The lens, reflector and filament assembly, above described, is detachably mounted in the front open end of the bell 14 by a mounting ring 33 having portions of channel-shaped cross section and having a forward bead 34 which bears against the front side of the channel-shaped rim 32. The mounting ring 33 has inwardly extending radial flanges 35 on its inner extremity provided with apertures in which set screws 36 are threaded. Although only one flange 35 and set screw 36 is illustrated in the drawing, it should be understood that several of these elements are provided in circumferentially spaced relation about the mounting ring 33. The unitary lens, reflector and filament assembly is spaced from the flange 22 of the bell 14 by a gasket 37 against which the rear side flange of the channel-shaped rim 32 is firmly pressed by tightening the screws 36.

Provided in the inner wall of the casing 10 is an opening 40 for receiving a detachable socket 41 having a plurality of releasable clamping members 42 arranged thereon in circumferentially spaced relation. The socket 41 extends through an enlarged opening 43 in the shell 12 and is provided with a light bulb 44 which serves to emit light rays on the external side of the light conducting reflector body portion.

Some of the light rays directed upon the reflector body portion 24 are transmitted edgewise through the latter and edgewise into the lens portion 23, the edgewise transmission of light being accommodated by the integral junction of the lens and reflector portions. When the concealed parking bulb 44 is illuminated it in turn illuminates the lens in the foregoing manner sufficiently to render the lens clearly conspicuous at night without creating a blinding glare.

The above described vehicle head light structure accommodates the use of a permanently sealed and factory focused lens, reflector and driving filament assembly from which all dirt, dust and other foreign matter is effectively excluded. The filament is a permanent part of the assembly which may be conveniently removed and replaced when the bulb burns out. In this event it is not necessary to replace the parking light bulb which is mounted externally of the assembly but so positioned with respect to the reflector that the light emitted thereby may be readily viewed in the large lens of the head light structure.

Although but one specific embodiment of the invention is herein shown and described, it will be apparent that various changes in the size, shape and arrangement of parts may be made without departing from the spirit of the invention.

I claim:

1. A vehicle head light comprising a casing having an opening, an hermetically sealed unitary lens, filament and reflector assembly mounted in said casing comprising glass lens and reflector body portions having integrally united edge portions, said reflector body portion having a reflecting film on its internal side, a parking light bulb in said casing located externally of said assembly and so arranged as to project light rays on the external side of said reflector body and edgewise through portions of the latter and of said lens, and a shell having an annular portion cooperating with the outer marginal part of said reflector body to enclose said parking light bulb for concentrating light rays from the latter around an arcuate area of said reflector body and lens.

2. A vehicle lamp including a lens, a concaved reflector having a transparent body portion in edgewise light communicating relationship with respect to said lens and having a reflecting surface on its internal side, a driving light source between said lens and said reflector, a shell on the side of said reflector opposite from its reflecting surface having annular wall portions spaced from and providing an annular chamber bounded in part by an area of said body portion which is in light communicating relation to said lens, and a light source between said shell and said area of said body portion for projecting light rays into said body portion and edgewise through the latter and through the marginal part of said lens.

IAN C. McKECHNIE.